(12) United States Patent
Mezer

(10) Patent No.: US 8,300,679 B2
(45) Date of Patent: Oct. 30, 2012

(54) SYSTEMS AND METHODS FOR ENHANCING PERFORMANCE OF A LOW-POWER TRANSCEIVER

(75) Inventor: Amir Mezer, Haifa (IL)

(73) Assignee: Intel Corporation, Santa Clara, CA (US)

(*) Notice: Subject to any disclaimer, the term of this patent is extended or adjusted under 35 U.S.C. 154(b) by 745 days.

(21) Appl. No.: 12/344,778

(22) Filed: Dec. 29, 2008

(65) Prior Publication Data

US 2010/0166125 A1 Jul. 1, 2010

(51) Int. Cl.
*H04B 1/38* (2006.01)
*H04B 1/04* (2006.01)
*H04L 5/16* (2006.01)
*H01Q 11/12* (2006.01)

(52) U.S. Cl. ........................................ 375/219; 455/126

(58) Field of Classification Search .................. 375/254, 375/291, 292, 350; 370/210, 290; 455/127.2, 455/189.1
See application file for complete search history.

(56) References Cited

U.S. PATENT DOCUMENTS

| | | | | |
|---|---|---|---|---|
| 3,873,924 A * | 3/1975 | Fathauer | ..................... | 455/168.1 |
| 4,987,373 A * | 1/1991 | Soo | ............................... | 327/145 |
| 5,331,315 A * | 7/1994 | Crosette | .......................... | 712/28 |
| 7,643,804 B2 * | 1/2010 | Chan | .......................... | 455/127.1 |
| 7,742,386 B2 * | 6/2010 | Jones et al. | ..................... | 370/201 |
| 2006/0227909 A1* | 10/2006 | Thomas et al. | ................ | 375/346 |
| 2007/0236853 A1* | 10/2007 | Crawley | ......................... | 361/119 |

OTHER PUBLICATIONS

A. Cichocki, S. A. Vorobyov, and T. Rutkowski, "Nonlinear interference cancellation using neural networks," in Proc. 1999 Int. Symp. Nonlinear Theory and its Applications, Nov. 28-Dec. 2, 1999, pp. 1005-1008.*

* cited by examiner

*Primary Examiner* — David C. Payne
*Assistant Examiner* — Wednel Cadeau
(74) *Attorney, Agent, or Firm* — Buckley, Maschoff & Talwalkar LLP

(57) ABSTRACT

According to some embodiments, a digital switching distortion canceller may receive Ethernet data along with an Ethernet class AB transceiver switching signal. A combiner may combine the output of the digital switching distortion canceller with a digital high switching distortion signal to generate a corrected output signal. According to other embodiments, a switching-signal-to-voltage-converter receives an Ethernet class AB transceiver switching signal and generates a common-mode compensation voltage adjustment. An analog combiner may combine the common-mode compensation voltage adjustment with a noisy common-mode signal to generate a stabilized common-mode voltage. Note that reduction of switching-related distortion might be achieved in the digital domain, in the analog domain, or in both domains according to the embodiments described herein.

7 Claims, 6 Drawing Sheets

SWITCHING ALGORITHM FOR POWER SAVING IN CLASS AB — 200

| CODE | mV | VCP (=INV{SEIN}) | | | | | | | | | VCN (=SEIN) | | | | | | | | |
|---|---|---|---|---|---|---|---|---|---|---|---|---|---|---|---|---|---|---|---|
| | | 8 | 7 | 6 | 5 | 4 | 3 | 2 | 1 | 0 | 8 | 7 | 6 | 5 | 4 | 3 | 2 | 1 | 0 |
| 8 | 1000 | 1 | 1 | 1 | 1 | 1 | 1 | 1 | 1 | 1 | 0 | 0 | 0 | 0 | 0 | 0 | 0 | 1 | 0 |
| 7 | 875 | 1 | 1(A) | 1 | 1 | 1 | 1 | 1 | 1 | 0 | 0 | 0 | 0 | 0 | 0 | 0 | 0 | 0 | 1 |
| 6 | 750 | 0(A) | 1(A) | 1 | 1 | 1 | 1 | 1 | 1 | 1 | 1(A) | 0(A) | 0 | 0 | 0 | 0 | 0 | 0 | 0 |
| 5 | 625 | 0(A) | 1(A) | 0(B) | 1 | 1 | 1 | 1 | 1 | 0 | 1(A) | 0(A) | 0 | 0 | 0 | 0 | 0 | 0 | 1 |
| 4 | 500 | 0(A) | 1(A) | 0(B) | 1(B) | 1 | 1 | 1 | 1 | 1 | 1(A) | 0(A) | 0 | 0(B) | 0 | 0 | 0 | 0 | 0 |
| 3 | 375 | 0(A) | 1(A) | 0(B) | 1(B) | 0(C) | 1 | 1 | 1 | 0 | 1(A) | 0(A) | 1(B) | 0(B) | 0 | 0 | 0 | 0 | 1 |
| 2 | 250 | 0(A) | 1(A) | 0(B) | 1(B) | 0(C) | 1(C) | 1 | 1 | 1 | 1(A) | 0(A) | 1(B) | 0(B) | 1(C) | 0(C) | 0 | 0 | 0 |
| 1 | 125 | 0(A) | 1(A) | 0(B) | 1(B) | 0(C) | 1(C) | 0 | 1 | 0 | 1(A) | 0(A) | 1(B) | 0(B) | 1(C) | 0(C) | 0 | 0 | 1 |
| 0 | 0 | 0(A) | 1(A) | 0(B) | 1(B) | 0(C) | 1(C) | 0 | 0 | 1 | 1(A) | 0(A) | 1(B) | 0(B) | 1(C) | 0(C) | 1 | 0 | 0 |
| -1 | -125 | 0(A) | 1(A) | 0(B) | 1(B) | 0(C) | 0 | 0 | 0 | 0 | 1(A) | 0(A) | 1(B) | 0(B) | 1(C) | 1 | 1 | 0 | 1 |
| -2 | -250 | 0(A) | 1(A) | 0(B) | 1(B) | 0 | 0 | 0 | 0 | 1 | 1(A) | 0(A) | 1(B) | 0(B) | 1 | 1 | 1 | 0 | 0 |
| -3 | -375 | 0(A) | 1(A) | 0(B) | 0 | 0 | 0 | 0 | 0 | 0 | 1(A) | 0(A) | 1(B) | 1 | 1 | 1 | 1 | 1 | 1 |
| -4 | -500 | 0(A) | 1(A) | 0 | 0 | 0 | 0 | 0 | 0 | 1 | 1(A) | 0(A) | 1 | 1 | 1 | 1 | 1 | 1 | 0 |
| -5 | -625 | 0(A) | 0 | 0 | 0 | 0 | 0 | 0 | 0 | 0 | 1 | 1 | 1 | 1 | 1 | 1 | 1 | 1 | 1 |
| -6 | -750 | 0 | 0 | 0 | 0 | 0 | 0 | 0 | 0 | 1 | 1 | 1 | 1 | 1 | 1 | 1 | 1 | 1 | 0 |
| -7 | -875 | 0 | 0 | 0 | 0 | 0 | 0 | 0 | 0 | 0 | 1 | 1 | 1 | 1 | 1 | 1 | 1 | 1 | 1 |
| -8 | -1000 | 0 | 0 | 0 | 0 | 0 | 0 | 0 | 0 | 0 | 1 | 1 | 1 | 1 | 1 | 1 | 1 | 1 | 1 |

FIG. 2

```
┌─────────────────────────────────┐
│  CONVERT ETHERNET CLASS         │
│  AB SWITCHING SIGNAL TO         │
│  GENERATE A COMMON-MODE         │
│  COMPENSATION VOLTAGE           │
│  ADJUSTMENT              602    │
└─────────────────────────────────┘
                │
                ▼
┌─────────────────────────────────┐
│  COMBINE COMMON-MODE            │
│  COMPENSATION VOLTAGE           │
│  ADJUSTMENT WITH A NOISY        │
│  COMMON MODE SIGNAL TO          │
│  GENERATE A STABILIZED          │
│  COMMON-MODE VOLTAGE            │
│                          604    │
└─────────────────────────────────┘
```

FIG. 6

SYSTEMS AND METHODS FOR ENHANCING PERFORMANCE OF A LOW-POWER TRANSCEIVER

Devices in a network, such as computers and/or peripherals, may communicate with each other through cables. For example, a computer might have an Ethernet transceiver that transmits and/or receives data through cables. To reduce the amount of power used by a transceiver, one or more current sources associated with the transmitter may be switched off when in a lower power mode (and switched on when in a higher power mode), according to the appropriate transmit voltage. Switching current sources off and on, however, may create substantial variations in a common-mode voltage, resulting in noisy voltages at the receiver and, as a result, limit the length of a cable that can be used to carry signals to other devices in the network.

BRIEF DESCRIPTION OF THE DRAWINGS

FIG. 2 is a table illustrating a switching algorithm for power saving according to some embodiments.

FIG. 6 is a flow chart of a method associated with a switching signal to voltage converter according to some embodiments.

DETAILED DESCRIPTION

Devices in a network, such as computers and/or peripherals, may communicate with each other through cables (including, for example, copper or fiber cables). For example, a computer might have an Ethernet transceiver that transmits and/or receives data through cables. Such an Ethernet transceiver might be associated with, for example, a 1 Gigabit-per-second (Gb/sec) Ethernet and/or a 10 Gb/sec transceiver in accordance with the Institute of Electrical and Electronics Engineers ("IEEE") standard 802.3 (2005). The transceiver might, for example, facilitate communications via a Local Area Network ("LAN"), a Wide Area Network ("WAN"), communication nodes, and/or infrastructure devices (e.g., hubs, switches, or routers).

Figure 1:
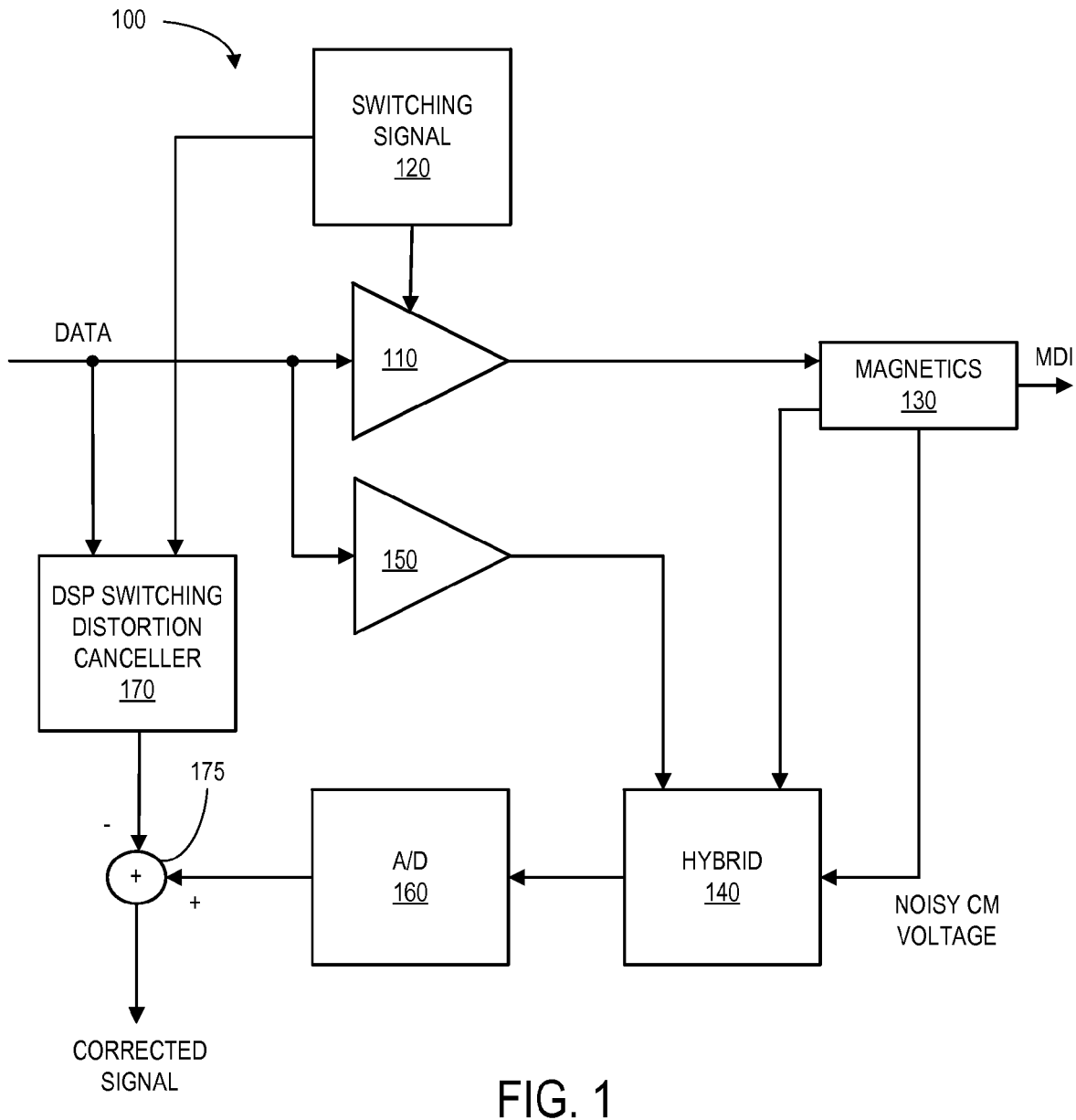
FIG. 1 is a block diagram of a system including a digital signal processor according to some embodiments.

FIG. 1 is a block diagram of a system 100 that may be associated with an Ethernet transceiver in accordance with some embodiments. In particular, the system 100 includes a transmitter 110 that receives data and generates an output that is provided to a magnetics element 130. The magnetics elements 130 generates a Media Dependent Interface (MDI) output and provides a signal to a hybrid element 140. The data received by the transceiver may also be provided to the hybrid element 140 through a replica element 150 in order to reduce the echo signal at the receiver. The analog output of the hybrid element 140 may be provided to an Analog-to-Digital ("A/D") converter 160 which in turn may generate an output.

To reduce the amount of power used by a transceiver, one or more current sources associated with the transceiver may be switched off when in a lower power mode (and switched on when in a higher power mode). An example of such a lower power mode is a "class AB" mode (named for symptomatic similarity to a class AB power amplifier and existing in contrast to higher power "class A" mode named due to the similarity to a class A power amplifier). In particular, in class A mode a transceiver's driver may draw a constant current level from a power supply (regardless of the transmitted voltage). This may result in constant, high power consumption operation.

In class AB mode, the driver may instead draw current proportional to a voltage being is transmitted. That is, at the highest voltage level, the highest current may drawn (and may in face be the same as the current drawn in class A mode). For lower voltage levels, lower amounts of current may be drawn. One method this may be done is by using a switching signal 120 (e.g., associated with a switching algorithm) which determines which current sources are switched off at which voltage levels. Consider, for example, FIG. 2 which is a table 200 that illustrates a switching algorithm for power saving in class AB mode for a 1 Gigabit Ethernet device, where 17 voltage levels are defined (each associated with a "code"). In particular, the transceiver is associated with nine potential current sources (0 through 8) and seventeen potential power saving levels (codes 8 through −8) each associated with a different voltage level −1000 milliVolts (mV) through 1000 mV.

In the table 200, "VCP" represents the positive current sources (numbered 0 through 8), where the current of source 0 and source 1 is half of the other sources (numbered 2 through 8). Note that the VCP currents contribute to producing a positive transmit voltage. Similarly, "VCN" represents the negative current sources (numbered 0 through 8), where the current of source 0 and source 1 is half of the other sources (numbered 2 through 8). The VCN currents contribute to producing a negative transmit voltage. Moreover, a "1" in the table 200 means that the associated source is "on" and a "0" means that the associated source is "off" in class A. Further note that VCP and VCN have opposite values (that is, when one if off the other is on).

In class A mode, for every transmitted voltage, either the VCP source or the VCN source is on, so the maximum number of current sources will always be on. In class AB mode, since there are pairs of current sources which cancel each other at certain voltage levels, those pairs may be switched off to save power. These pairs are designated in the table 200 as group "A" (a family which may be switched off, comprised of current sources 7 and 8), group "B" (another family which may be switched off, composed of current sources 5 and 6), and group "C" (still another family which may be switched off, composed of current sources 3 and 4).

For example, when ±1000 mV or ±875 mV is transmitted, none of the current sources are switched off (which may be considered a switching family). When ±750 mV or ±625 mV is transmitted, the family designated as group "A" in the table 200 may be switched off. When ±500 mV or ±375 mV is transmitted, the family designated as group "B" in the table 200 may be switched off (along with family "A"). When ±250 mV or ±125 mV is transmitted, the family designated as group "C" in the table 200 may be switched off (along with families "A" and "B"). Note that it might be possible to save even more power when 0V is transmitted (by introducing another family that turns off current sources 0, 1, and 2). However, the power saved by such an approach might be relatively low (and such an additional family might not be utilized).

Switching current sources off and on, however, may create noisy voltages in the transceiver and, as a result, limit the length of a cable that can be used to carry signals to other devices in the network. That is, in class AB mode the constant current changes may result in a changing Common-Mode (CM) level at a receiver's analog front-end, which can cause a hybrid at the receiver to enter non-linear points of operation. This, in turn, may degrade the performance of the receiver and reduce the length of cables that may be used to connect devices. For example, in class A mode a 110 meter (m) cable might be functional (because the current remains constant) while in class AB mode only cables up to 90 m might perform adequately.

To reduce such an effect, some embodiments of the present invention employ a Digital Signal Processor (DSP), such as a DSP implemented in Si. For example, the system 100 illustrated in FIG. 1 includes a digital (e.g., DSP) switching distortion canceller 170 that receives the switching signal 120 (e.g., an Ethernet class AB transceiver switching signal) along with Ethernet data and generates an output. A combiner 175 subtracts the output of the digital switching distortion canceller 170 from the signal of the A/D converter 160 (e.g., a signal with a high switching distortion due to a noise CM voltage level) to generate a corrected output signal.

Figure 3:
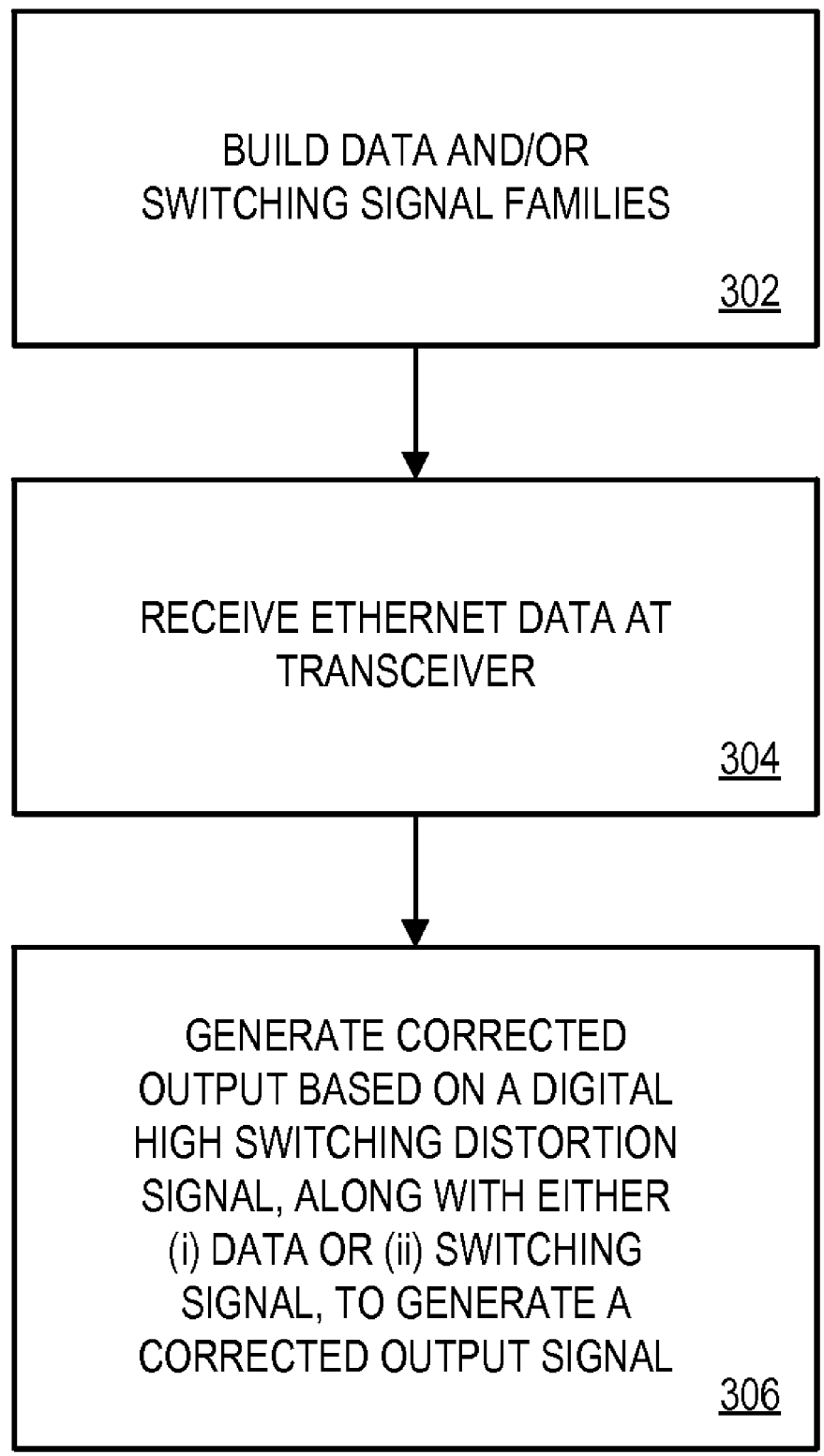
FIG. 3 is a flow chart of a method associated with a digital signal processor according to some embodiments.

FIG. 3 is a flow chart of a method according to some embodiments. The flow charts described herein do not necessarily imply a fixed order to the actions, and embodiments may be performed in any order that is practicable. The method of FIG. 3 may be associated with, for example, a system 100 such as the one described with respect to FIG. 1. Note that any of the methods described herein may be performed by hardware, software (including lower level code, such as microcode), or a combination of hardware and software. For example, a storage medium may store thereon instructions that when executed by a machine result in performance according to any of the embodiments described herein.

At 302, a plurality of data signal families and/or a plurality of AB transceiver switching signal families may be built. For example, some Ethernet data signals might be categorized in a first group while other data signals are assigned to a second group.

At 304, Ethernet data may be received at an Ethernet transceiver (e.g., from a remote device via a network). At 306, a corrected output may be generated based on a digital high switching distortion signal (e.g., associated with a noisy CM voltage level), along with at least one of (i) the received Ethernet data or (ii) an Ethernet class AB transceiver switching signal, to generate a corrected output signal. For example, a DSP element might correct the digital high switching distortion signal based on the transmitted Ethernet data and at least one of the plurality of data signal families. Similarly, a DSP element might correct the digital high switching distortion signal based on the Ethernet class AB transceiver switching signal and at least one of a plurality of switching signal families. According to some embodiments, the corrected output is generated based on both the received Ethernet data and the Ethernet class AB transceiver switching signal.

Figure 4:
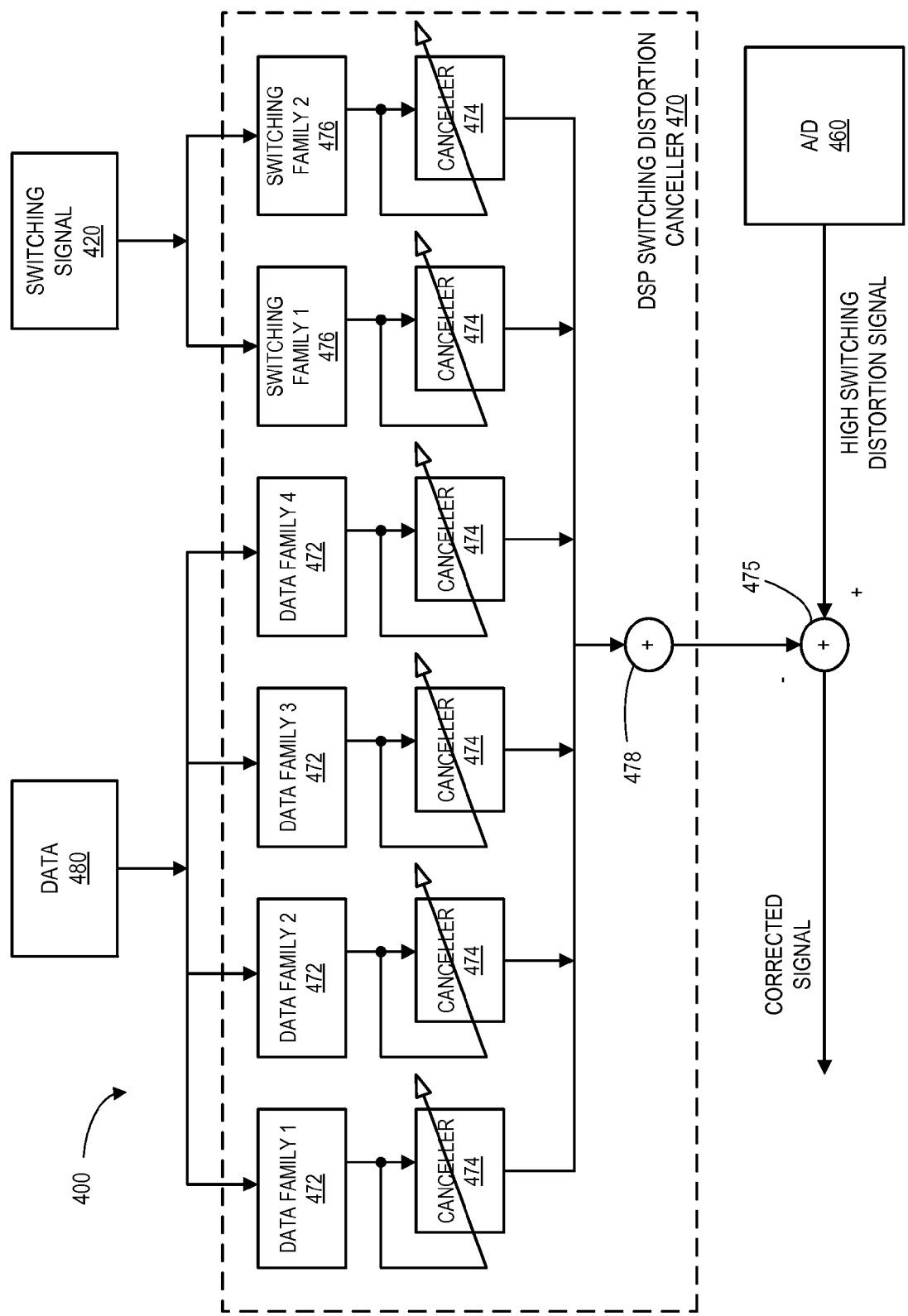
FIG. 4 illustrates a system with a more detailed example of a digital signal processor according to some embodiments.

FIG. 4 illustrates a system 400 with a more detailed example of a digital signal processor according to some embodiments. As before, a switching distortion canceller 470 receives a switching signal 420 along with Ethernet data 480. The received data 480 may be used to control one or more canceller elements 474 in accordance with a data family 472 associated that data (with four data families being illustrated in FIG. 4 by way of example). Similarly, the switching signal 420 may be used to control one or more canceller elements 474 in accordance with a switching family 476 associated that switching signal (with two switching signal families being illustrated in FIG. 4 by way of example). Note that a signal transmitted at a local transceiver may be the one which affects the common-mode voltage (and introduces distortion). Moreover, the local receiver may have full knowledge of the data it has transmitted (and the switching families used), and the switching families are associated with the local transmit signal. Further note that in some embodiments, additional switching families could be built (e.g., a complex family could be constructed to represent situations where switching family 1 was always followed by switching family 2). Note that at least some of the canceller elements might be associated with Finite Impulse Response (FIR) filter taps and that the digital switching distortion canceller 470 might be is adapted based on, for example, a Least Mean Squares (LMS) filter algorithm.

The outputs of the cancellers 474 are combined at a combiner 478 and provided to a combiner 475 which subtracts that signal from a high switching distortion signal received from an A/D converter 460 to generate a corrected output signal.

Note that it may be possible to build (e.g., at design time) a family of signals from transmitted data and/or switching signals, which are linearly correlated to the switching distortion introduced by the noisy CM voltage at on input of a hybrid element. Moreover, these families might substantially describe the switching distortion signal. Thus, it may be possible to build an adaptive algorithm in a DSP switching distortion canceller 470 that adapts the cancellers 474 so that after they are combine with the A/D converter 460 output, a cancelation of the high switching distortion may be achieved. According to some embodiments, the high switching distortion signal is actually adaptively reconstructed in the DSP switching distortion canceller 470, and then subtracted from the received signal that includes the high switching noise distortion (e.g., the A/D converter 460 output).

As a result, the cancellers 474 may display successful reduction of the high switching distortion after adaptation. Although adaptation might be performed using a LMS algorithm, note that similar adaptation algorithms may be used in accordance with any of the embodiments described herein. According to some embodiments, the DSP switching distortion canceller 470 is comprised of several adaptive cancellers 474, where the reference signal for filtration and adaptation of each canceller 474 is one of the family members (e.g., data or switching signal families). The cancellers 474 may all be summed to produce a single DSP switching distortion canceller 470 output. Note that such an approach may represent an application of a linear correction model to a non-linear noise phenomena. Moreover, the power consumption associated with the operation of the DSP switching distortion canceller 470 may be negligible. As a result of the DSP switching distortion canceller 470, any lost cable reach associated with the Ethernet class AB power saving mode may be improved.

Figure 5:
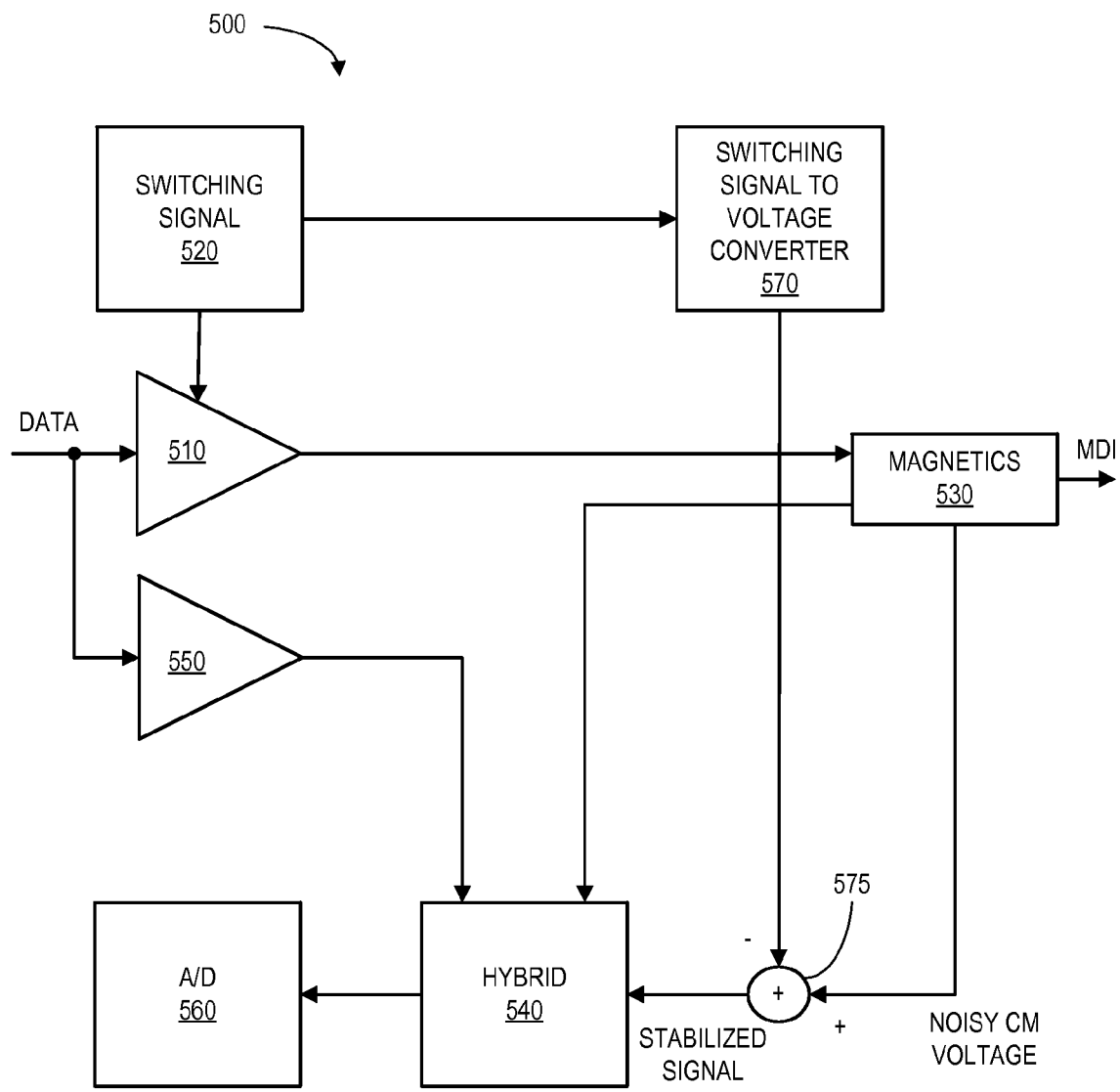
FIG. 5 is a block diagram of a system including a switching signal to voltage converter according to some embodiments.

While embodiments described with respect to FIGS. 1 through 4 have operated in the digital domain, note that improvements to a transceiver might also be achieved in the analog domain. For example, FIG. 5 is a block diagram of a system 500 according to some embodiments. As before, the system 500 includes a transmitter 510 that receives data and generates an output that is provided to a magnetics element 530. The magnetics elements 530 generates an MDI output and provides a signal to a hybrid element 540. The data received by the transceiver may also be provided to the hybrid element 540 through a replica element 550. The analog output of the hybrid element 540 may be provided to an A/D converter 560 which in turn may generate an output.

To reduce the amount of power used by a transceiver, one or more current sources associated with the transceiver may be switched off when a lower power mode (e.g., associated with an Ethernet class AB mode switching signal 520). Switching current sources off and on, however, may create noisy voltages in the transceiver and, as a result, limit the length of a cable that can be used to carry signals to other devices in the network. For example, a noisy CM voltage from the magnetics element 530 may limit operation of the system 500.

To reduce such an effect, some embodiments of the present invention employ a switching-signal-to-voltage-converter 570 to receive the Ethernet class AB transceiver switching signal 520 and to generate a common-mode compensation voltage adjustment. An analog combiner 575 may then subtract the common-mode compensation voltage adjustment from a noisy common-mode signal to generate a stabilized common-mode voltage. Note that CM noise may be substantially proportional to the switching signal 520 used for power saving in class AB mode.

According to this embodiment, the switching signal 520 may be fed 520 (e.g., through a filter) into a CM compensation circuit—such as the switching signal to voltage converter 570—which may convert it into noisy voltage in opposite polarity to the CM noise which is present as a result of the changing current levels. The noisy CM and the compensating signal may be summed at the combiner 575, resulting in a stable CM voltage at the hybrid element 540 input. As a result, an enhanced, robust receiver in class AB mode may be provided. The filter of the CM compensation circuitry, into which the switching signal 520 may fed, could be adaptive or adjustable according to some embodiments. Note that the power consumption of the CM compensation circuitry may be negligible.

FIG. 6 is a flow chart of a method associated with a switching signal to voltage converter according to some embodiments. At 602, an Ethernet class AB switching signal is converted to generate a CM compensation voltage adjustment. That CM compensation voltage adjustment may then be combined with a noisy common mode signal to generate a stabilized CM voltage at 604 (which, in turn, might be provided to an AD converter via a hybrid element).

Thus, embodiments described herein may provide systems and methods to help reduce cable reach loss associated with a reduced power mode, including the Ethernet class AB mode.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to particular Ethernet environments, note that embodiments may be practiced with other types of Ethernet and non-Ethernet environments. Moreover, although particular circuits and circuit elements have been provided herein as examples, embodiments may be associated with any other types of circuits and circuit elements as appropriate.

The several embodiments described herein are solely for the purpose of illustration. Persons skilled in the art will recognize from this description other embodiments may be practiced with modifications and alterations limited only by the claims.

What is claimed is:
1. A method, comprising:
receiving, at a switching-signal-to-voltage-converter, a lower-power mode transceiver switching signal;
generating a common-mode compensation voltage adjustment;
combining the common-mode compensation voltage adjustment with a noisy common-mode signal at an analog combiner to generate a stabilized common-mode voltage, wherein the noisy common-mode signal is associated with a medium dependent interface output signal, and wherein the lower power mode is associated with an Ethernet class AB mode;
receiving, at a digital switching distortion canceller, Ethernet data along with an Ethernet class AB transceiver switching signal;
generating an output, wherein the digital switching distortion canceller includes a first plurality of canceller elements, each associated with an Ethernet data signal family sharing signals of the same type, and a second plurality of canceller elements, each associated with an AB transceiver switching signal family, wherein outputs from the first and second pluralities of canceller elements are combined to generate the output of the digital switching distortion canceller; and
combining, at a digital domain combiner, the output of the digital switching distortion canceller with a digital signal to generate a corrected output signal.
2. The method of claim 1, further comprising:
building each AB transceiver switching signal family.
3. An apparatus, comprising:
a switching-signal-to-voltage-converter to receive an lower-power mode transceiver switching signal and to generate a common-mode compensation voltage adjustment; and
an analog combiner to combine the common-mode compensation voltage adjustment with a noisy common-mode signal to generate a stabilized common-mode voltage, wherein the noisy common-mode signal is associated with a medium dependent interface output signal, wherein the lower power mode is associated with an Ethernet class AB mode and further comprising:
a digital switching distortion canceller to receive Ethernet data along with an Ethernet class AB transceiver switching signal and to generate an output wherein the digital switching distortion canceller includes a first plurality of canceller elements, each associated with an Ethernet data signal family sharing signals of the same type, and a second plurality of canceller elements, each associated with an AB transceiver switching signal family, wherein outputs from the first and second pluralities of canceller elements are combined to generate the output of the digital switching distortion canceller; and
a digital domain combiner to combine the output of the digital switching distortion canceller with a digital signal to generate a corrected output signal.
4. The apparatus of claim 3, further comprising:
a filter associated with the switching-signal-to-voltage-converter.
5. The apparatus of claim 4, wherein the filter is associated with at least one of: (i) an adaptive filter, or (ii) an adjustable filter.
6. The method of claim 1, wherein a filter is associated with the switching-signal-to-voltage-converter.
7. The method of claim 6, wherein the filter is associated with at least one of: (i) an adaptive filter, or (ii) an adjustable filter.

* * * * *